United States Patent [19]

Barker

[11] Patent Number: 4,472,540

[45] Date of Patent: Sep. 18, 1984

[54] WIDE JOINT LATEX GROUT COMPOSITION

[75] Inventor: John P. Barker, Souderton, Pa.

[73] Assignee: American Olean Tile Company, Lansdale, Pa.

[21] Appl. No.: 398,225

[22] Filed: Jul. 14, 1982

[51] Int. Cl.$^3$ .......................... C08K 7/00; C08K 3/34; C0K 3/10

[52] U.S. Cl. .................................. 523/220; 524/388; 524/446; 524/493

[58] Field of Search ................ 523/220; 524/388, 446, 524/493

[56] References Cited

U.S. PATENT DOCUMENTS

| | | | |
|---|---|---|---|
| 3,325,430 | 6/1967 | Grasley | 523/220 |
| 3,637,572 | 1/1972 | Ogata et al. | 523/220 |
| 3,658,750 | 4/1972 | Tsukui et al. | 523/220 |
| 3,940,358 | 2/1976 | Bernett | 523/220 |
| 4,059,551 | 11/1977 | Weiant et al. | 523/220 |
| 4,171,228 | 10/1979 | Lowrey | 523/220 |
| 4,356,037 | 10/1982 | Novak | 523/220 |

*Primary Examiner*—C. Warren Ivy
*Attorney, Agent, or Firm*—Finnegan, Henderson, Farabow, Garrett & Dunner

[57] ABSTRACT

A wide joint latex grout composition is disclosed comprising a thermoplastic film-forming resin latex and particulate mineral filler, the fillers comprising from about 74 to about 88 percent by weight of the grout composition and possessing a wide range of particle sizes, a major proportion of the grout comprising sand. Cracking in joints up to about one inch wide is avoided by the high sand loading, and dilatancy problems expected from such high sand loadings are obviated by closely controlling the particle size distribution of the sand and other inorganic fillers.

6 Claims, No Drawings

4,472,540

WIDE JOINT LATEX GROUT COMPOSITION

BACKGROUND OF THE INVENTION

1. Field of the Invention

This invention is concerned with grout compositions, particularly grout compositions capable of filling either wide or narrow joints between ceramic, cement and other tile.

2. Description of the Prior Art

Tile, such as ceramic or cement tile, is generally employed as a protective and decorative covering for walls and floors in areas which are subject to heavy soiling. It is common, for example, to employ tile in kitchens, bathrooms, family rooms, entry ways, countertops, and the like in the home and in public and commercial buildings. The primary advantage of employing tile in these areas is the relative ease of maintaining and cleaning the tiled surface.

Tile is installed by adhering a plurality of individual tiles to the area to be covered and then filling the spaces between the individual tiles with grout. The conventional grout for ceramic tile is white, premixed grout containing portland cement and additives. Since the ceramic tiles that are employed are usually dense or glazed on their exposed surface, such surface limits penetration. Therefore, these tiles do not readily soil, and, if they become soiled, they are easily cleaned. However, the cement grouts heretofore employed were to some extent porous and readily became soiled. The soiled grouts clearly detracted from the overall appearance of the tiled surfaces.

In addition to having resistance to soiling and ease of cleanability, the grout composition should also be relatively simple to apply. In this regard, it is highly advantageous to have a premixed grout composition which can be applied directly from the container in which it is supplied. It is also quite valuable for any excess grout to be recoverable for use at a later time. The grout composition should also be plastic enough to be readily worked into the spaces between the individual tiles. In addition, the excess grout which is applied should be easily removed from the tile surfaces. The grout should also dry in a relatively short time to a hard finish and with little or no shrinkage or cracking.

U.S. Pat. No. 3,859,233 (hereinafter "the '233 patent") issued to the present inventor, John P. Barker, on Jan. 7, 1975, discloses a grout composition which is resistant to soiling, easily cleaned, workable, fast-drying, easy to clean up during application and which can be provided as a premixed composition. The grout composition there described comprises a thermoplastic film-forming resin latex, preferably an acrylic latex, a white inorganic filler, for example, whiting, and a finely divided clay. The composition could also include thickening agents, silica sand, colorants, agents to control the rate of drying, fungicides, antifoaming agents, and wetting agents. The disclosed grout composition could contain 20–60 parts by weight of white inorganic filler having a particle size passing through 325 mesh (less than 44 microns in diameter), up to about 25 parts of a finely divided 2–20 micron clay, and up to 50 parts by weight of a silica sand having a particle size passing through 70–100 mesh (less than 150 to 210 microns in diameter).

The sand was added to the composition of the '233 patent as an abrasive to assist in the cleaning of excess grout from the surface of the tile during application. The sand content had to be limited to below 50 parts because of dilatancy problems associated with latex compositions containing high loadings of sand.

Dilatancy is the property of a composition whereby it exhibits increased apparent viscosity when subjected to increased shear stresses. The classic example of a dilatant composition is a water and sand mixture, which, when worked by stirring or otherwise, exhibits a vastly increased apparent viscosity. A dilatant grout composition is extremely difficult to mix initially and to work into the joints between the tiles since the shear stresses imposed on the mixture during mixing and application have the effect of increasing the apparent viscosity of the grout composition.

While the grout composition of the '233 patent yields excellent results in narrow tile joints between absorptive tiles (12 to 16% absorption), that is, tile joints having widths in the range of 1/16 to ⅛ of an inch, the grout displays a tendency to crack when used to fill wide joints, that is, joints greater than ⅛ inch in width, i.e., ⅛ to about one inch in width.

It has been suggested by certain manufacturers of prior art grouts, such as the C.E. Kaiser Co. of Houston Texas, manufacturer of K.B. Mastic Grout, that their narrow joint grout compositions can be used to fill wide joints without cracking if a substantial quantity, i.e., at least 25% by weight, of sand extender is added to the commercial grout. However, such efforts to alter narrow joint grout compositions result in undesirably dry and unworkable compositions which are believed to present dilatancy problems similar to those experienced with high sand loadings in the grout of the '233 patent.

Accordingly, it is an object of the present invention to provide a grout composition providing all the advantages of the grout composition of the '233 patent, including resistance to soiling, ease of cleaning, workability, ease of clean-up during application, fast drying and availability in premixed form, while avoiding the cracking and/or dilatancy problems presented by such compositions in wide joints.

Other objects and advantages of the invention will be set forth in part in the description which follows, and in part will be obvious from the description, or may be learned from the practice of the invention. The objects and advantages of the invention may be realized and attained by means of the instrumentalities and combinations particularly pointed out in the appended claims.

SUMMARY OF THE INVENTION

It has been discovered that wide joint latex grout compositions which resist cracking in joints up to about one inch wide may be formed using a thermoplastic film-forming resin latex binder and particulate mineral fillers of a specified character and particle size. Compositions in accordance with the invention include fillers comprising from about 74 to about 88 percent by weight of the grout composition and possessing a wide range of particle sizes, a major proportion of the grout being sand. Sand and latex are present in compositions of the present invention in balanced amounts sufficient to prevent cracking during the drying of the grout in joints up to about 1" wide. The distribution of the range of mineral filler particle sizes is selected so as to obtain optimum particle packing, which imparts stain resistance in the dried grout and which imparts workability and forestalls dilatancy in the wet grout composition. Specifically, the filler component of the grout composition of the present invention may comprise a mixture of approximately equal proportions of a first sand portion and a second sand portion, the first sand portion having a larger average particle size and lower AFS grain fineness number than the second sand portion. For example, the first sand portion may have a particle size distribution between about 44 and about 590 microns and an AFS grain fineness number of about 48 and the second sand portion may have a particle size distribution between about 44 and about 300 microns and an AFS grain fineness number of about 143. Preferably, the first and second sand portions are each present in an amount of from more than 25% to about 35% by weight of the grout compositions. The composition may also include from about 5 to about 30% by weight of whiting and from about 0 to about 8% by weight of a finely divided clay, each with a maximum particle size less than the mean particle size of the second (smaller) sand portion.

The wide joint latex grout of the present invention may be used in the formation of constructions comprising a plurality of sub-elements, such as tiles, joined to a substrate, so as to leave a space between at least two of the sub-elements, by applying the grout composition in a manner to fill the space between the sub-elements and allowing it to dry. Such constructions may be formed with stain-free and crack-free joints up to about one inch in width and without undesirable dilatancy in the wet grout.

DESCRIPTION OF THE PREFERRED EMBODIMENTS

Reference will now be made in detail to the presently preferred embodiments of the invention, which together with the following examples, serve to explain the principles of the invention.

As used throughout this specification, the compositional percentages given are by weight of the wet grout unless otherwise stated. Particle size distributions are defined throughout this specification, unless otherwise stated, in terms of the maximum and minimum particle diameters within the range and the "AFS grain fineness number." The American Foundry Society grain fineness number is calculated from a standard sieve analysis as follows:

---

AFS No. =
(weight of particles on No. 6 mesh screen × 3 plus
weight of particles on No. 12 mesh screen × 5 plus
weight of particles on No. 30 mesh screen × 10 plus
weight of particles on No. 40 mesh screen × 20 plus
weight of particles on No. 50 mesh screen × 30 plus
weight of particles on No. 70 mesh screen × 40 plus
weight of particles on No. 100 mesh screen × 50 plus
weight of particles on No. 140 mesh screen × 100 plus
weight of particles on No. 200 mesh screen × 140 plus
weight of particles on No. 270 mesh screen × 200 plus
weight of particles through No. 270 mesh screen × 300)
÷ 100

---

A wide joint latex grout composition according to the present invention comprises a thermoplastic film-forming resin latex and particulate mineral fillers, the fillers comprising from about 74 to about 88 percent by weight of the grout composition and possessing a wide range of particle sizes, the major proportion of the grout composition comprising sand. As above noted, sand and latex are present in compositions of the present invention in balanced amounts sufficient to prevent cracking of the dried grout in joints up to about one inch wide. The distribution of the mineral filler particle sizes is selected so as to obtain optimum particle packing, which imparts stain resistance to the dried grout and imparts workability and forestalls dilatancy in the wet grout composition. Specifically, the filler component of the grout composition of the present invention may comprise a mixture of approximately equal proportions of a first sand portion and a second sand portion, the first sand portion having a larger average particle size and lower AFS grain fineness number than the second sand portion. For example, the first sand portion may have a particle size distribution between about 44 and about 590 microns and an AFS grain fineness number of about 48 and the second sand portion may have a particle size distribution between about 44 and about 300 microns and an AFS grain fineness number of about 143. Preferably, the first and second sand portions are each present in an amount of from more than 25% to about 35% by weight of the grout composition. The filler may also contain additional particulate material comprising from about 5 to about 30% by weight of a white inorganic filler, such as whiting, and from about 0 to about 8% by weight of a finely divided clay, each with a maximum particle size less than the mean particle size of the sand particles of the second (smaller) sand portion.

The compositions of the present invention include lower concentrations of clay particles than were required by the '233 patent and do not require the use of organic thickeners, which appeared to be one of the factors responsible for the cracking in wide joints when grouting compositions such as that disclosed in the '233 patent dried. Grout compositions in accordance with the present invention may be used in any width joint with tile of any absorptivity, including nonabsorptive tile, whereas the grout of the '233 patent worked well without cracking only in narrow joints, i.e., less than ⅛ inch wide, with absorptive tile.

The grout composition of this invention contains about 8 to about 18, preferably about 12, percent by weight of a thermoplastic film-forming resin latex, preferably a cement grade acrylic resin latex. The thermoplastic resins which are suitable for employment in this invention are those described in the '233 patent, the entire disclosure of which is hereby specifically incorporated by reference herein, and, as there described, must be capable of binding together several times their weight of inorganic fillers. In addition, the thermoplastic resins must be air dryable at room temperature to provide a stain resistant, cleanable grout. The thermoplastic resins are preferably of the water dispersible type in order to facilitate clean-up of the tile surfaces after application. The thermoplastic resins are added to the grout composition in the form of a latex containing about 40 to about 60 percent, and preferably about 50 percent, by weight of the solid thermoplastic resin.

The acrylic latices which are employed in the compositions of this invention are generally referred to as cement additive grade acrylic latices. In general, acrylic latices of types that may be used to advantage in the practice of the present invention are water-based latices containing polymers of one or more monomers, each of which has the structural formula

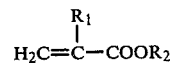

wherein $R_1$ is selected from a group consisting of hydrogen or the alkyl radicals of the series $-C_nH_{2n+1}$, $R_2$ is selected from the same group, not including hydrogen, and n is a whole number from 1-18.

The acrylic latices employed in this invention, whether it be a homopolymeric or copolymeric material, are polymerized to relatively high molecular weights. The molecular weights can be from, for example, 100,000 up into the millions. The acrylic latices utilized in this invention bind the remaining components of the grout together into a unitary mass as a result of drying rather than polymerization. Accordingly, it is not necessary to add catalysts or the like to the compositions of this invention immediately before use and any excess material can be saved for future use by simply preventing the grout from drying out.

While the acrylic resins are the preferred class of thermoplastic resins for employment in this invention, other types of thermoplastic resins may also be used in place of the acrylic resin or in combination with the acrylic resins. The polyvinyl acetate polymers are particularly useful. Copolymers of vinyl acetate with dibutyl fumarate, vinyl chloride, vinyl alkyl ethers, vinylidene chloride, ethylene and other similar thermoplastic resins may be used to some advantage in the present compositions. The exact amount of thermoplastic resin latices that must be used in order to obtain a grout composition having the optimum properties will vary depending upon the other components of the composition. The amount of thermoplastic resin latex which is added should be an amount at least sufficient to bond the composition together and impart stain resistance and cleanability to the composition and should not exceed 18%, preferably 12%, of the total grout composition.

A lower latex concentration than that of the '233 patent is normally required in the present invention. The overall mineral particle size is larger in the present composition, less clay is used and no organic thickener need be used. The resulting reduction in viscosity is normally compensated for by using lower amounts of latex.

The grout composition of this invention further contains various other mineral fillers. The particle size ranges of these mineral fillers are important as they prevent cracking in wide joints, forestall dilatancy and establish optimum particle packing which contributes strongly to the stain resistance characteristics and the surface smoothness of the dried grout. There are also, however, lower limits with respect to the particle size, which, if uncontrolled, can be detrimental to the structural strength of the dried grout. The minimum average particle size should be above 20 microns.

One of the principal components of this invention is a major proportion, preferably 50 to 70 percent by weight, most preferably more than 50 to about 70 percent, of sand. The presence of a major proportion of sand is necessary to avoid the cracking problems experienced with prior art grouting compositions. Preferably, and to assist in forestalling dilatancy which would otherwise plague the compositions of the present invention, the sand component of the grout composition is present in at least two portions. Each such portion is present in approximately equal amounts, the first portion having a relatively large average particle size and the second portion having a relatively small average particle size. The first sand portion may, for example, have a particle size distribution between about 44 and about 590 microns and an AFS average grain fineness of about 48, in which case the second sand portion may, for example, have a particle size distribution between about 44 and about 300 microns and an AFS average grain fineness of about 143. Similarly, compositions within the scope of the present invention may be formed using a first sand portion having a particle size of from about 44 to about 590 microns and an AFS average grain fineness of about 48 and a second sand portion having a particle size distribution between about 44 and about 590 microns and an AFS average grain fineness of about 97. Most preferably, the grout composition may be formed using a first sand portion having a particle size of from about 44 to about 590 microns and an AFS average grain fineness of about 48 and a second sand portion having a particle size of from about 44 to about 210 microns and an AFS average grain fineness of about 115-125. The two sand portions are preferably each present in an amount of from about 25, most preferably more than 25, to about 35, most preferably 33, percent.

Preferred sands having a relatively large average particle size include, for example, Berkeley #1 dry sand distributed by Pennsylvania Glass Sand Corporation. Preferred sand in the smaller particle size range may be LSS-12 sand from Manley Bros. of Troy Grove Ill., Central 100 mesh sand from Central Silica Company, Berkley Fine Dry Sand provided by Pennsylvania Glass Sand Corporation or C-10 sand from Wedron Silica Company. Of course, the characterization of the foregoing sands and their equivalents is relative. It is possible to form grouts according to the present invention from two coarse sands or two fine sands so long as one is finer than the other in the manner required by the appended claims.

Sieve analyses on these five sands in order of increasing fineness are reproduced below:

| mesh | microns | % | AFS Average Grain Fineness |
|---|---|---|---|
| 1. Berkeley #1 Dry | | | |
| 30 | 590 | 1.7 | |
| 40 | 420 | 14.8 | 48 |
| 50 | 300 | 37.0 | |
| 70 | 210 | 28.6 | |
| 100 | 150 | 12.7 | |
| through 100 | about 44-150 | 5.2 | |
| 2. Central 100 Mesh | | | |
| 30 | 590 | 1.0 | 97 |
| 40 | 420 | 3.5 | |
| 50 | 300 | 10.5 | |
| 70 | 210 | 18.5 | |
| 100 | 150 | 19 | |
| 140 | 105 | 18 | |
| 200 | 74 | 17 | |
| 270 | 53 | 10 | |
| through 270 | about 44-53 | 2.5 | |
| 3. LSS-12 | | | |
| 70 | 210 | 1.5 | 115-125 |
| 100 | 150 | 12 | |
| 140 | 105 | 46 | |
| 200 | 78 | 30 | |
| 270 | 53 | 8 | |
| through 270 | about 44-53 | 2.5 | |
| 4. C-10 Sand | | | |
| 70 | 210 | .2 | 131 |
| 100 | 150 | 8.4 | |
| 140 | 105 | 42.0 | |
| 200 | 74 | 32.0 | |
| 270 | 53 | 12.4 | |
| 325 | 44 | 5.0 | |
| 5. Berkley fine Dry | | | |

-continued

| mesh | microns | % | AFS Average Grain Fineness |
|---|---|---|---|
| 50 | 300 | 2.3 | 143 |
| 70 | 210 | 11.1 | |
| 100 | 150 | 14.0 | |
| 140 | 105 | 18.8 | |
| 200 | 74 | 20.1 | |
| 270 | 53 | 13.4 | |
| through 270 | about 44–53 | 20.3 | |

Compositions of the present invention also include from about 5 to about 30, preferably about 17, percent by weight of a white inorganic filler. Various well-known types of white inorganic fillers such as whiting or marble dust can be employed. The preferred white inorganic filler for use in this invention is whiting. The grades of whiting (calcium carbonate) that are most suitable for employment in the grout compositions of this invention have a particle size distribution such that the maximum whiting particle size is smaller than the average particle size of the aforementioned second or smaller average particle size sand portion. It is particularly preferred that the whiting have a maximum particle size near or below the minimum sand particle size. Particularly preferred materials include #6 York whiting from the National Gypsum Company having a particle size distribution between about 2 and about 44 microns. Less whiting is used in the present grout than in the grout of the '233 patent to allow for the use of higher sand loadings and also to attain the mineral particle size packing range necessary for stain resistance.

Other white inorganic fillers which may be used are, for example, marble dust, calcium mono-silicate, flint, alumina, talc, pyrophyllite and other alumino-silicate materials.

The grout composition further contains up to about 8 parts, preferably about 2 parts, by weight of a finely divided clay. The clay is believed to further fill in the space between the particles of the sand and white inorganic filler. The resultant particle packing has a definite beneficial effect on the stain resistance and flowability of the grout. Moreover, the clay acts as an inorganic thickener for the grout, as more specifically detailed hereinafter. Various types of finely divided clays can be used, such as kaolin, china clay, bentonite or ball clay. The processed kaolins, such as Avery clay sold by Harris Mining Company and EPK clay sold by Feldspar Corp., have proven to be most useful.

Particularly preferred clays for use in the grout compositions of this invention have a particle size distribution such that the maximum clay particle size is smaller than the average particle size of the aforementioned second or smaller average particle size sand portion. It is particularly preferred that the clay have a maximum particle size near or below the minimum sand particle size. Particularly preferred clays include EPK clay distributed by the Feldspar Corp., having a particle size distribution between about 0.2 and about 40 microns.

Despite the fact that the present invention contains less latex, no organic thickener and a reduced clay content in comparison to the products of the '233 patent, the viscosity of the present grout composition is similar to that of compositions formed in accordance with the '233 patent. The ability to obtain grouts of equivalent viscosity at lower liquid contents is significant in attaining crack-free joints in accordance with the invention. If the liquid contents of the grout are too high, joint cracking may result regardless of the nature of the solid filler.

Because of the unique particle size distribution and composition of the inorganic filler portion of the grout of the present invention, and its interaction with the latex binders of the present invention, it is unnecessary to employ organic thickening agents in the grouts of the present invention. Organic thickening agents had been suspected as one cause of cracking in wider joints filled with prior art grout compositions. The use of organic thickening agents is not preferred in the wide joint latex grouts of the present invention since they tend to cause cracking, keep the grout wet too long and cause clean-up problems. Accordingly, it is preferred in the present invention to employ clay as above described to give the wet grout the desired consistency. However, if thickening agents are necessary or desirable for specific applications of the grout composition of the present invention, it is possible, though not preferred, to employ in the present invention thickening agents such as those described in the '233 patent in the amounts there indicated.

The latex grout formulation as above described is light gray in color. When it is desired to have colored grouting, pigmentation may be effected by the addition of about 0.1 to about 3, preferably about 0.7, percent by weight of a dry pigment, which will be well dispersed by the grinding action of the sand during mixing. The type and amount of colorant that is employed is dependent on the desired color and depth of shade. When a white grout is desired titanium dioxide is advantageously added to the composition. A premixed grout may be formed in accordance with the invention which may be colored subsequently by the addition of solid or liquid dyes or pigments.

Other additives which can be incorporated to some advantage are, for example, agents to control the rate of drying, fungicides, dispersing agents and antifoaming agents. The agents to control the rate of drying which have proven to be most useful are the polyhydric alcohols having 2 to 6 carbon atoms, in particular, ethylene glycol. When ethylene glycol is employed, about 1 to about 8, preferably about 3, percent by weight is added to the composition. Less ethylene glycol is needed to maintain open time with the grout composition of the present invention than was necessary with the grout of the '233 patent since less latex resin is required.

The grouts of the present invention do not appear to require fungicides to prevent growth of mildew, etc. If mildew or the like were to prove to be a problem in a particular application, about 0.1 to about 5% by weight of fungicide could be added to the grout. The fungicides that can be employed in the composition are well-known in themselves, for example, phenylmercuric salts, trialkyltin oxide and commercial products such as Advacide TJP-Special manufactured by Advance Division, Carlisle Chemical Works. The amount of fungicide that must be added to the composition to be effective is dependent on the particular fungicide employed.

A dispersing agent is not required but can be added to the composition of this invention. The addition of a dispersing agent assists considerably in the preparation of the composition, and the dispersing agents are useful in preventing caking of the composition on extended storage in containers. The selection of the dispersing agent that is employed is to a large extent a matter of personal preference. The requirements for the dispersing agent are that it effectively suspend or disperse the composition and not adversely affect the other components of the composition, especially the thermoplastic resin. A commercially available dispersing agent that has proven to be particularly useful is Tamol 731 manufactured by Rohm and Haas Company.

The addition of antifoaming agents, although not essential, facilitates both the initial preparation of the composition and the application of the grouting composition to the tile. An example of a suitable antifoaming agent is Antifoam 60 manufactured by the General Electric Company.

The compositions of this invention are prepared by simply blending together the required amount of each of the above-noted components. The blended compositions are kept covered to prevent drying until ready for use.

The grout compositions of this invention are applied in the conventional manner by forcing the composition into the spaces between the tiles with a rubber-faced grouting trowel and then wiping the excess grout composition from the tile. The grout compositions of this invention, when employed in wide joints and allowed to dry at room temperature, are dry to the touch in 3 to 6 hours, have an initial set in approximately 48 hours and should be fully dried in about five to seven days.

Once the grouting is dry, it is highly resistant to both staining and soiling and can readily be cleaned if it does become soiled. More significantly, the grouting of the present invention, upon drying, does not crack in wide joints in the manner experienced with prior art groutings. Accordingly, grouts of the present invention work well in any width joint with tile of any absorptivity. Specifically, the tile body being grouted may be impervious (less then 0.5% water absorption), vitreous (0.5 to 3% water absorption), semi-vitreous (3 to 7% water absorption) or non-vitreous (more than 7% water absorption, including the absorptive wall tile having up to about 12 to 18 percent water absorption) without cracking being found in the dried grouted joints up to about one inch in width. The elimination of cracking in wide joints is attained in grouts of the present invention without adverse dilatancy effects, which would have been expected from grouts containing sand loadings as high as those required by the present invention, due to the unique coaction and particle size distribution of the particulate fillers contained therein and the coaction of the particulate fillers with the latex binder.

While operable compositions may be prepared having individual components present within the above-stated ranges, care must be taken in adjusting the remaining components in accordance with the following general criteria in order to obtain optimal results. If the latex component is inordinately high, say in excess of 15% of the total composition, the mix is likely to be too low in viscosity. The net result of excessive water loss on drying will be cracking. If excessive amounts of an agent to control drying rate, such as ethylene glycol, are used in an effort to reduce shrinkage from water loss, i.e., in excess of about 7% of the total composition, the grout may require excessively long times to harden. Clay can be used to thicken the grout, but an amount of clay above about 5% of the total composition may itself cause cracking in otherwise optimal mixes.

Moreover, some care must be exercised in the selection of additives such as organic thickening agents, pigments, anti-foaming agents and the like to be sure that they are not added in amounts which adversely affect otherwise balanced compositions. Verification of the operable ranges of any such additive may readily be determined by testing such as that detailed in the following examples.

Regarding the ability of the grouts of the present invention to form crack-free wide joints with all types of tile, it must be noted that the drying of the grout may be facilitated in narrower joints by the absorbtivity of the tile. However, in non-absorbtive tile, such as the Primitive ®brand tile referred to in the following examples, drying must occur primarily by evaporation from the surface. As a practical matter, joints greater than about ⅜ of an inch in width are sufficiently wide that the central portions of the grouted joint must dry solely by evaporation from the surface in the manner of a wide grouted joint. Thus, while the grouts of the present invention have been shown to provide crack-free wide joints and have been described as forming such crack-free joints up to about one inch in width, there is no technical impediment to forming even wider joints with the present grout. It is readily seen that once the joint width has exceeded that at which tile absorption loses its effect on drying, the joint could be expanded at will without altering the crack-free drying mechanism of the grouts of the present invention.

The following examples are given by way of illustration and are not intended to limit the scope of the appended claims. The parts given are to be understood to be parts by weight of the grout composition unless otherwise indicated.

EXAMPLE 1

A grout composition in accordance with the present invention was prepared from the following components:

| | |
|---|---|
| Rhoplex E-330 (acrylic resin latex manufactured by Rohm and Haas Co.) | 12 parts |
| Ethylene glycol (manufactured by Union Carbide and Chemicals Co.) | 3 parts |
| #6 York whiting (manufactured by National Gypsum Co.) | 17 parts |
| EPK clay (manufactured by Feldspar Corp.) | 2 parts |
| Berkeley #1 dry sand (manufactured by Pennsylvania Glass & Sand Co.) | 33 parts |
| Central 100 mesh sand (manufactured by Central Silica Co.) | 33 parts |
| Total | 100 parts |

The premixed liquids (latex and glycol) are charged in a low speed, moderate shear mixer. The premixed solids are slowly added. Mixing continues for 10–30 minutes after all the solids have been added. The mixer is then opened and the dry material scraped from the mixer blades. About 0.01 parts of AF72 silicone defoamer manufactured by the General Electric Company is then added to the mix. Vacuum is applied to the mixer and slow agitation is used to deaer the grout.

The Berkeley #1 dry sand has a particle size distribution in the range of from about 44 to about 590 microns and an AFS average grain fineness number of about 48. The Central 100 mesh sand has a particle size range of from about 44 to about 590 microns and an AFS average grain fineness number of about 97. The #6 York whiting has a particle size range of from about 2 to about 44 microns and the EPK clay has a particle size range of from about 0.2 to about 40 microns.

The grout may be easily mixed and applied to form crack-free joints up to about one inch in width, although the product is somewhat coarser than that of Example 2.

EXAMPLE 2

A grout composition in accordance with the present invention was prepared by admixing the following ingredients:

| | |
|---|---|
| Rhoplex E-330 | 12 parts |
| Ethylene glycol | 3 parts |
| York #6 whiting | 17 parts |
| EPK clay | 2 parts |
| Berkeley #1 dry sand | 33 parts |
| Berkeley Fine dry sand | 33 parts |
| Total | 100 parts |

The Berkeley Fine dry sand has a particle size distribution of from about 44 to about 300 microns and an AFS average grain fineness number of about 143.

Testing of the above-described grout composition was performed with 4¼×4¼ inch glazed tile and 4×8 inch Primitive ® tile (ceramic paver tiles) manufactured by American Olean Tile Company. Both types of tile were set on wallboard or plywood with 0.5 inch wide joints. Stain testing was run on week-old joints. Permanent blue ink was applied to the joint and allowed to dry for 45 minutes. It was then rinsed with water. Comet cleanser with Chlorinol (an abrasive cleanser containing a chlorine-based bleach) was applied to the joint and scrubbed 50 times with a wet Py-Co-Pay hard toothbrush. The joint was then wiped with a wet sponge and the same procedure repeated to give a total of 100 scrub cycles. The joint was then wiped clean with a wet sponge. A rating of "trace" was given to the grout composition of this example on stain testing, meaning that one can barely discern a shadow of the stain remaining. No joint cracking, wide or narrow, was found.

EXAMPLE 3

The grout of Example 2 was prepared substituting 33 parts of Manley LSS-12 sand for Berkeley Fine Dry sand. A particularly preferred grout with good workability resulted which may be used to form crack-free joints up to one inch wide.

Joints formed with the grout were stained with permanent blue ink for 45 minutes. After cleaning with Comet cleanser with Chlorinol with a Py-Co-Pay toothbrush (100 cycles); a moderate stain remained. After an additional 10 minutes standing with cleanser in contact with the stain followed by another 100 cycles of brushing, only a light stain remained without significant grout erosion.

COMPARATIVE EXAMPLE 4

A grout composition was prepared by admixing the following ingredients:

| | |
|---|---|
| Rhoplex E-330 | 15 parts |
| Ethylene glycol | 4 parts |
| Flint (fine SiO$_2$) | 10 parts |
| Fine Avery clay | 5 parts |
| C-10 sand | 62.6 parts |
| Ti-Pure R 900 (TiO$_2$ pigment) | 2.87 parts |
| Fungicide | .5 parts |
| GE Antifoam 60 (defoamer) | 0.03 parts |
| Total | 100 parts |

The mixture was unacceptably dilatant and difficult to work. Joints formed with the mixture exhibited heavy ink staining when tested in the manner of Example 2.

COMPARATIVE EXAMPLE 5

The grout of Comparative Example 4 was modified by employing as the sand component 50 parts of C-10 sand and 12.6 parts of Berkeley #1 Dry sand. While improved over the composition of Comparative Example 4, the grout of Comparative Example 5 is still unacceptably dilatant and unworkable. The dried grout was cracked in wide joints and exhibited moderate to heavy ink staining.

Guidance relating to the balancing of grout components required to attain desired properties of workability, stain resistance and freedom from cracks in accordance with the present invention may be derived from the following table of examples:

TABLE I

| Rhoplex E-330 | Ethylene Glycol | Whiting (York) | Flint | Clay (Bleached Avery) | Sand 1 (Berkeley #1 Dry) | Sand 2 (C-10 70 mesh) | TiO Pigment | Fungicide | Defoamer | Dispersing Agent | Organic Thickener | Cracks + / No Cracks − | Comments |
|---|---|---|---|---|---|---|---|---|---|---|---|---|---|
| 14 | 4 | 12.4 | | | 66 | | 2.87 | .5 | .03 | .1 | .1 | + | |
| 11 | 7 | 12.4 | | | 66 | | 2.87 | .5 | .03 | .1 | .1 | + | |
| 11 | 7 | — | | | 78.4 | | 2.87 | .5 | .03 | .1 | .1 | — | not dry in 10 days |
| 13 | 7 | — | | | 76.5 | | 2.87 | .5 | .03 | | .1 | — | not dry in 7 days |
| 13 | 7 | — | | | 57.5 | 19 | 2.87 | .5 | .03 | | .1 | — | grout stays soft |
| 16 | 4 | — | | 5 | 52.6 | 19 | 2.87 | .5 | .03 | | .1 | + | pulled from edge |
| 16 | 4 | — | | 15 | 42.6 | 19 | 2.87 | .5 | .03 | | | + | |
| 16 | 4 | — | 15 | | 42.6 | 19 | 2.87 | .5 | .03 | | | — | soupy, heavy stain |
| 16 | 4 | — | 7 | 8 | 42.6 | 19 | 2.87 | .5 | .03 | | | + | pulled from edge |
| 16 | 4 | 15 | | | 42.6 | 19 | 2.87 | .5 | .03 | | | — | soupy |
| 15 | 4 | | 7 | 12 | 39.6 | 19 | 2.87 | .5 | .03 | | | + | |
| 15 | 4 | | 10 | 5 | 42.6 | 20 | 2.87 | .5 | .03 | | | + | soupy |
| 15 | 4 | | 10 | 5 | — | 62.6 | 2.87 | .5 | .03 | | | | dilatent, heavy stain |
| 15 | 4 | | 10 | 5 | 12.6 | 50 | 2.87 | .5 | .03 | | | + | dilatant |
| 16 | 4 | 15 | | 5 | 28 | 28 | 2.87 | .5 | .03 | | | + | |
| 16 | 4 | 35 | | 5 | 20 | 20 | | | | | | − | soupy |

TABLE I-continued

| | | | | | | | absorptive tile | |
|---|---|---|---|---|---|---|---|---|
| 16 | 4 | 35 | 10 | 17 | 18 | | + : | |
| 16 | 4 | 35 | 7 | 20 | 18 | | + : | soupy |
| | | | | | | | edge | |
| 10 | 3 | 22 | 5 | 30 | 30 | | + : | heavy |
| | | | | | | | light | paste |
| 12 | 3 | 20 | 5 | 30 | 30 | | + | edge crack |
| 12 | 5 | 18 | 5 | 30 | 30 | | + | edge crack |
| 8 | 5 | 22 | 5 | 30 | 30 | | − | very dry paste; hard to grout |
| 10 | 3 | 25 | 2 | 30 | 30 | | − | stiff grout |
| 10 | 3 | 27 | — | 30 | 30 | | − | |
| 12 | 3 | 23 | 2 | 30 | 30 | | − | |
| 13 | 3 | 22 | 2 | 30 | 30 | | + | light edge crack |

| Rhoplex E-330 | Ethylene Glycol | Whiting (York) | Flint | Clay (Bleached Avery) | Sand 1 (Berkeley #1 Dry) | Sand 2 (C-10 70 mesh) | Sand 2 Berkeley Fine Dry | Sand 2 Central Silica 100 | Sand 2 Manley LSS-12 | TiO2 Pigment | Fungicide | Defoamer | Cracks + / No Cracks − | Comments |
|---|---|---|---|---|---|---|---|---|---|---|---|---|---|---|
| 9 | 3 | 20 | | 2* | 33 | 33 | | | | | | | − | *Result same with 3 different clays |
| 9 | 3 | 20 | | 2 | 33 | | 33 | | | | | | − | dry mix |
| 11 | 3 | 18 | | 2 | 33 | | 33 | | | | | | − | grouts well |
| 12 | 3 | 17 | | 2 | 33 | | | 33 | | 28 g | | 100 drops | | coarse grout |
| 14 | 3 | 17 | | 2 | 33 | | | | 33 | 40 g | | 20 drops | + | soupy |

It will be apparent to those skilled in the art that various modifications and variations can be made in the wide joint latex grout composition of the present invention without departing from the scope or spirit of the invention. Thus, it is intended that the present invention cover the modifications and variations of this invention provided that they come within the scope of the appended claims and their equivalents.

What is claimed is:

1. A wide joint latex grout composition consisting essentially of about 12% by weight of thermoplastic film-forming acrylic resin latex, about 3% by weight ethylene glycol, about 17% by weight whiting, about 2% by weight of finely divided clay, said whiting having a particle size distribution between about 2 and about 44 microns and said finely divided clay having a particle size distribution between about 0.2 and about 40 microns, about 33% by weight of a first sand portion having a particle size distribution between about 44 and about 590 microns and having an AFS grain fineness of about 48, about 33% by weight of a second sand portion having a particle size distribution between about 44 and about 590 microns and an AFS grain fineness of about 97, and 0 to about 0.7% by weight of dry pigment, said latex and said sand portions being present in sufficient balanced quantity to prevent cracking of the dried grout in joints up to about 1" wide, and the distribution of the inorganic particle sizes being sufficient to impart stain resistance to the dry grout and to impart workability and to forestall dilatancy in the wet grout composition without added organic thickeners.

2. A wide joint latex grout composition consisting essentially of about 12% by weight of a thermoplastic film-forming acrylic resin latex, about 3% by weight ethylene glycol, about 17% by weight whiting, about 2% by weight finely divided clay, said whiting having a particle size distribution between about 2 and about 44 microns and said finely divided clay having a particle size distribution between about 0.2 and about 40 microns, about 33% by weight of a first sand portion having a particle size distribution between about 44 and about 590 microns and having an AFS grain fineness of about 48, about 33% by weight of a second sand portion having a particle size distribution between about 44 and about 300 microns and an AFS grain fineness of about 143, and 0 to about 0.7% by weight of dry pigment, said latex and said sand portions being present in sufficient balanced quantity to prevent cracking of the dried grout in joints upon to about 1" wide, and the distribution of the inorganic particle sizes being sufficient to impart stain resistance to the dry grout and to impart workability and to forestall dilatancy in the wet grout composition without added organic thickeners.

3. A wide joint latex grout composition consisting essentially of about 12% by weight of a thermoplastic film-forming forming acrylic resin latex, about 3% by weight ethylene glycol, about 17% by weight whiting, about 2% by weight finely divided clay, said whiting having a particle size distribution between about 2 and about 44 microns and said finely divided clay having a particle size distribution between about 0.2 and about 40 microns, about 33% by weight of a first sand portion having a particle size distribution between about 44 and about 590 microns and an AFS grain fineness of about 48, about 33% by weight of a second sand portion having a particle size distribution between about 44 and about 210 microns and an AFS grain fineness of about 115 to 125, and 0 to about 0.7% by weight of dry pigment, said latex and said sand portions being present in sufficient balanced quantity to prevent cracking of the dried grout in joints up to about 1" wide, and the distribution of the inorganic particle sizes being sufficient to impart stain resistance to the dry grout and to impart workability and to forestall dilatance in the wet grout composition without added organic thickeners.

4. A construction comprising a plurality of sub-elements joined to a substrate so as to leave a space between at least two of said sub-elements, said space filled by a wide joint latex grout composition formed in accordance with claim 1, 2 or 3.

5. A construction as defined in claim 4 wherein said sub-elements are absorptive or non-absorptive tile.

6. A construction as defined in claim 4 wherein said space is between about ⅛ and about one inch wide and is filled to form a crack-free joint.

* * * * *